United States Patent [19]

Monnot

[11] Patent Number: 4,575,306

[45] Date of Patent: Mar. 11, 1986

[54] SLURRY PUMP MECHANICAL SEAL MOUNTING ASSEMBLY

[75] Inventor: James A. Monnot, Baton Rouge, La.

[73] Assignee: Kaiser Aluminum & Chemical Corporation, Oakland, Calif.

[21] Appl. No.: 644,909

[22] Filed: Aug. 28, 1984

[51] Int. Cl.⁴ .................. F04D 29/10; F04D 29/60
[52] U.S. Cl. .......................... 415/131; 415/170 A;
   415/171; 415/173 R; 277/92; 403/344
[58] Field of Search ........... 415/171, 170 A, 173 R,
   415/174, 131, 132, 129, 140, 141, 130, 126, 172
   R; 403/344, 336, 337; 384/273, 258; 277/93 R,
   88, 89, 90, 92, 81 R

[56] References Cited

U.S. PATENT DOCUMENTS

| | | | |
|---|---|---|---|
| 2,049,774 | 8/1936 | Hoffman | 415/170 A |
| 2,472,264 | 6/1949 | Payne | 277/93 |
| 2,710,503 | 6/1955 | Boyd | 415/170 R |
| 2,930,636 | 3/1960 | Tracy | 277/93 |
| 3,025,070 | 3/1962 | Copes | 277/93 |
| 4,256,313 | 3/1981 | Arnold | 277/92 |
| 4,418,919 | 12/1983 | Wentworth | 277/40 |
| 4,509,773 | 4/1985 | Wentworth | 277/92 |

FOREIGN PATENT DOCUMENTS 1261800 12/1961 France ................. 415/170 A

Primary Examiner—Robert E. Garrett
Assistant Examiner—H. Edward Li
Attorney, Agent, or Firm—Andrew E. Barlay

[57] ABSTRACT

A mechanical seal mounting assembly for a centrifugal high solids concentration slurry pump is disclosed. A rotating seal ring adapter is secured to the pump's impeller drive shaft for rotation with the shaft. A stationary seal ring adapter is secured to a first end of a seal carrier which extends through the pump's back plate. A split gland ring is attached to a second end of the seal carrier and is supported by gland nuts threadedly carried on gland bolts. The gland bolts are attached to a bearing assembly for the pump shaft. Axial movement of the pump shaft to effect impeller clearance seal adjustment is possible without disturbing the mechanical seal adjustment. An O-ring is interposed between the pump back plate and the seal carrier and is held in place by an O-ring retainer secured to the back plate of the pump.

9 Claims, 11 Drawing Figures

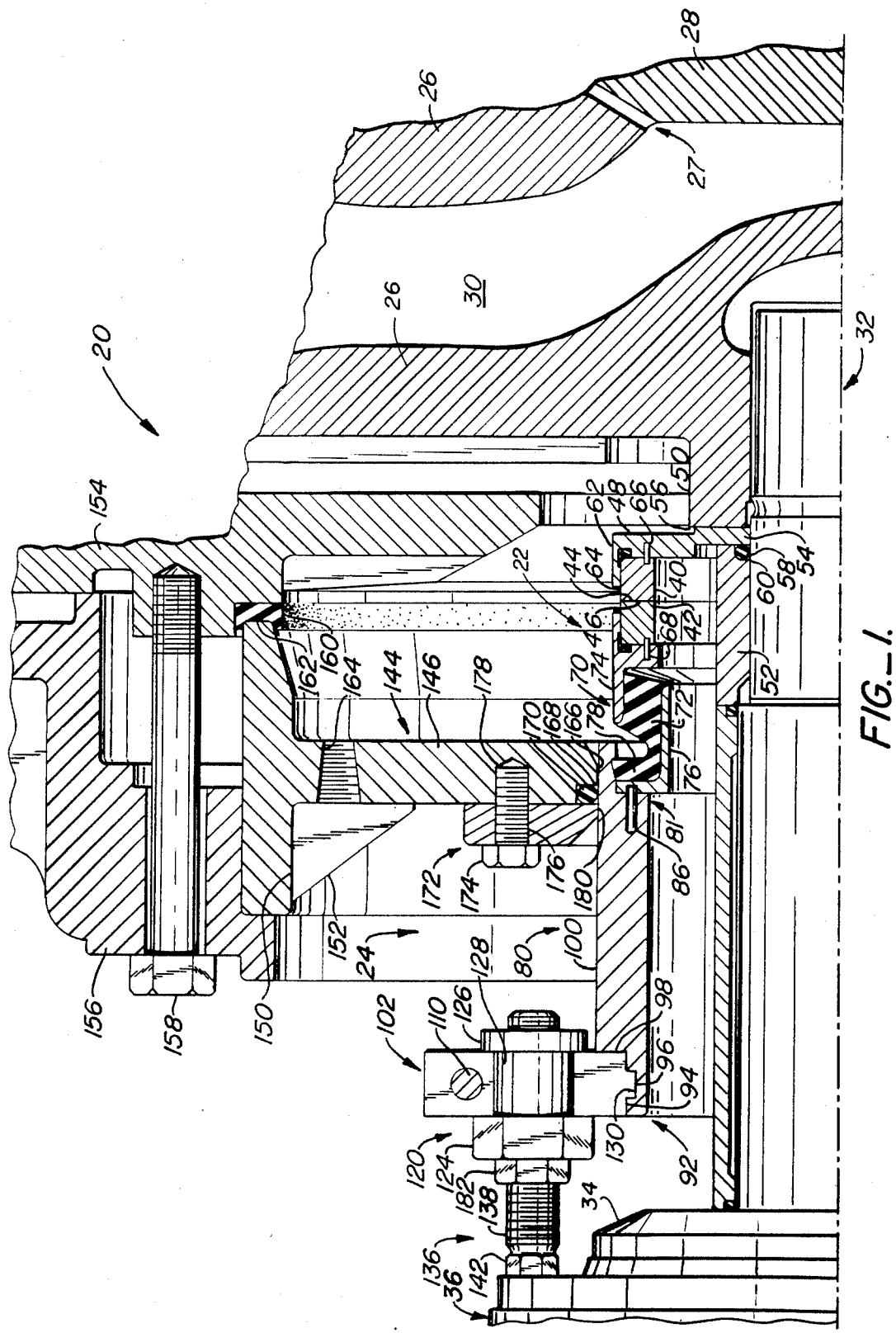
FIG._1.

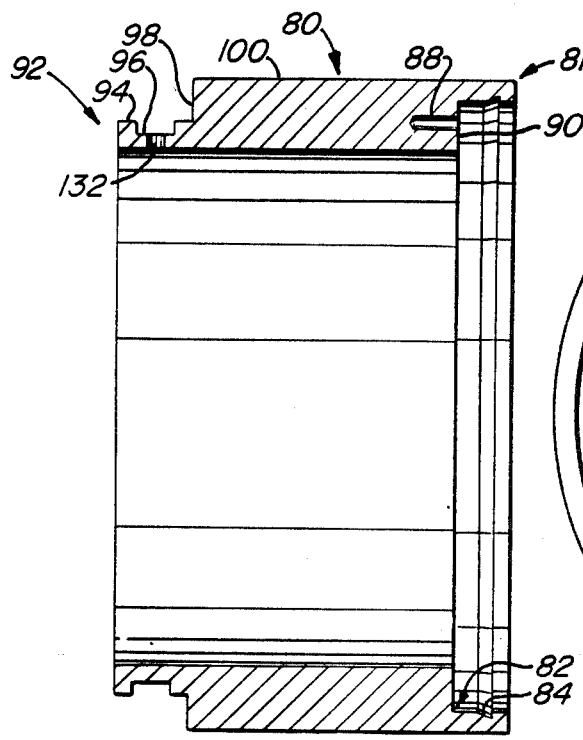
FIG._2.
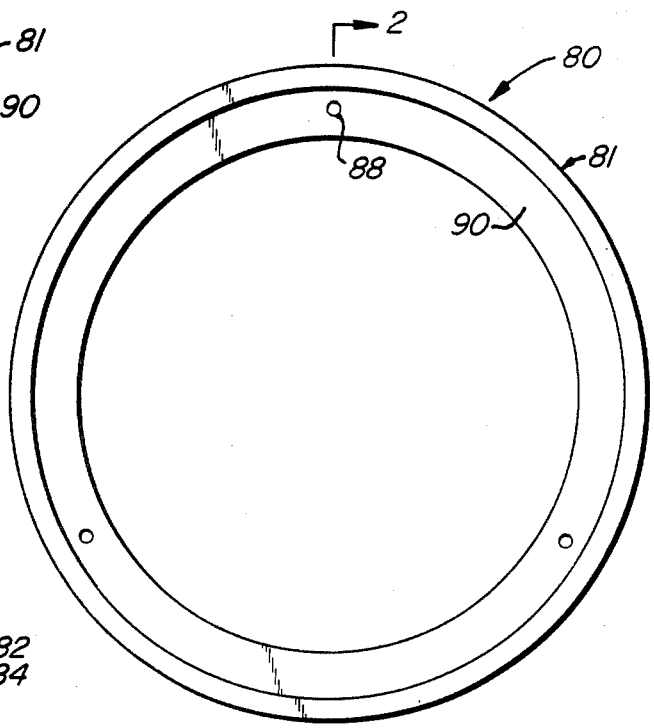
FIG._3.
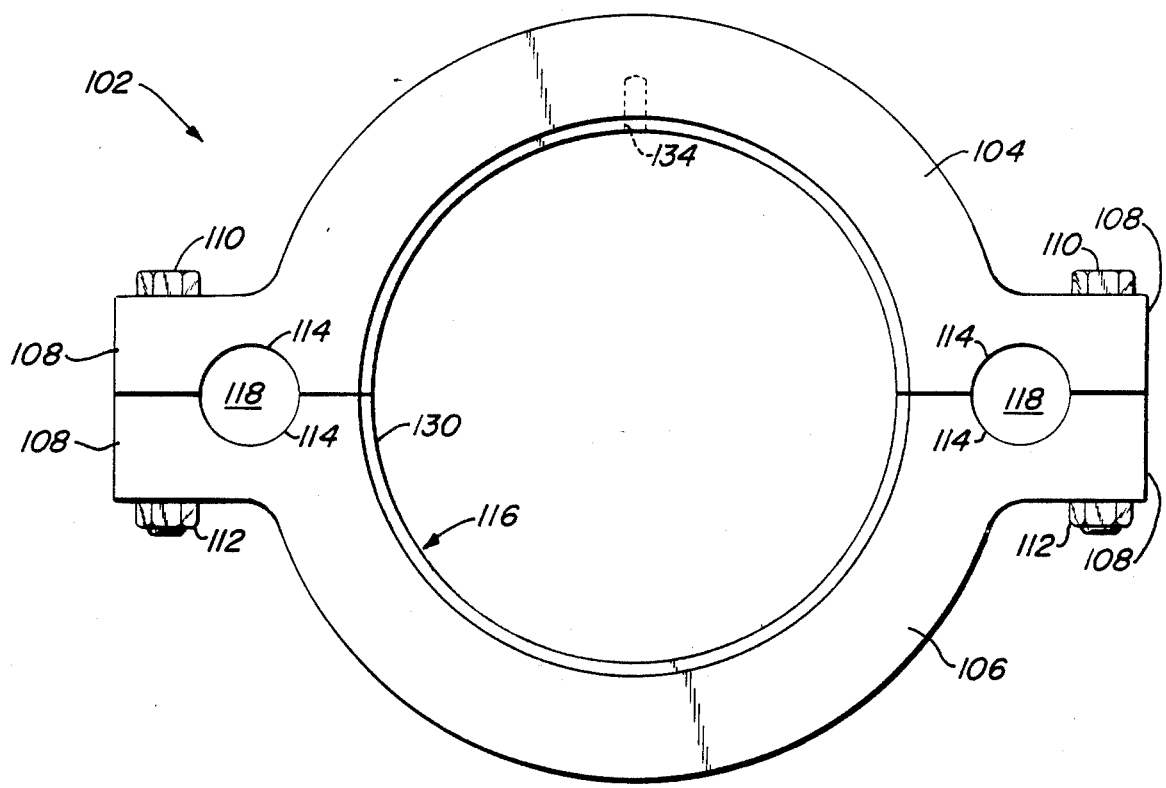
FIG._4.

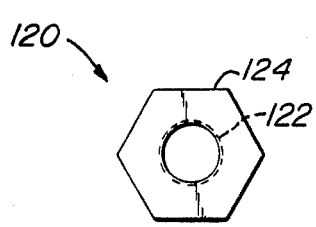
FIG._5.
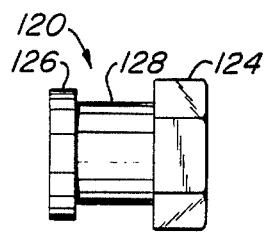
FIG._6.
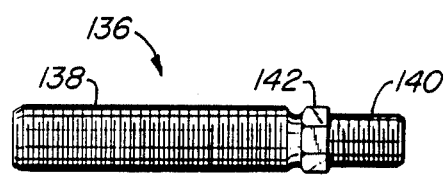
FIG._7.
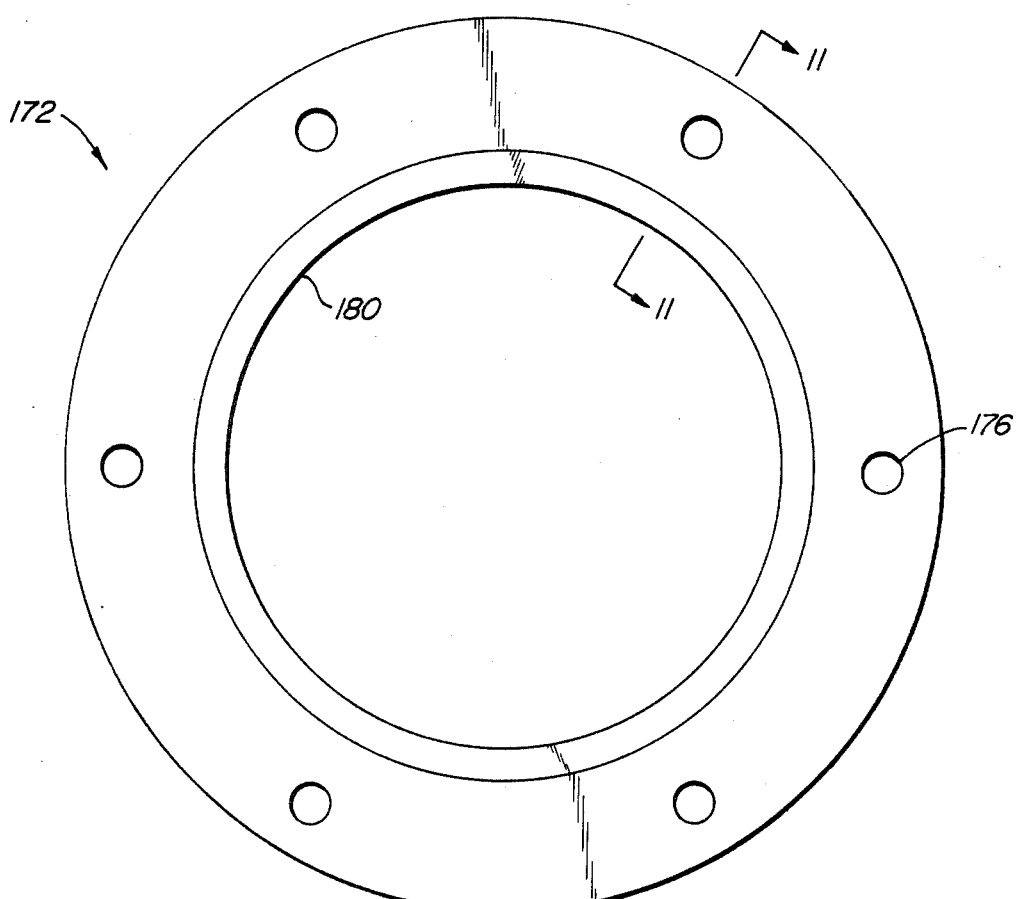
FIG._10.
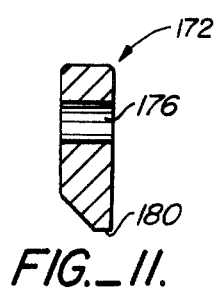
FIG._11.

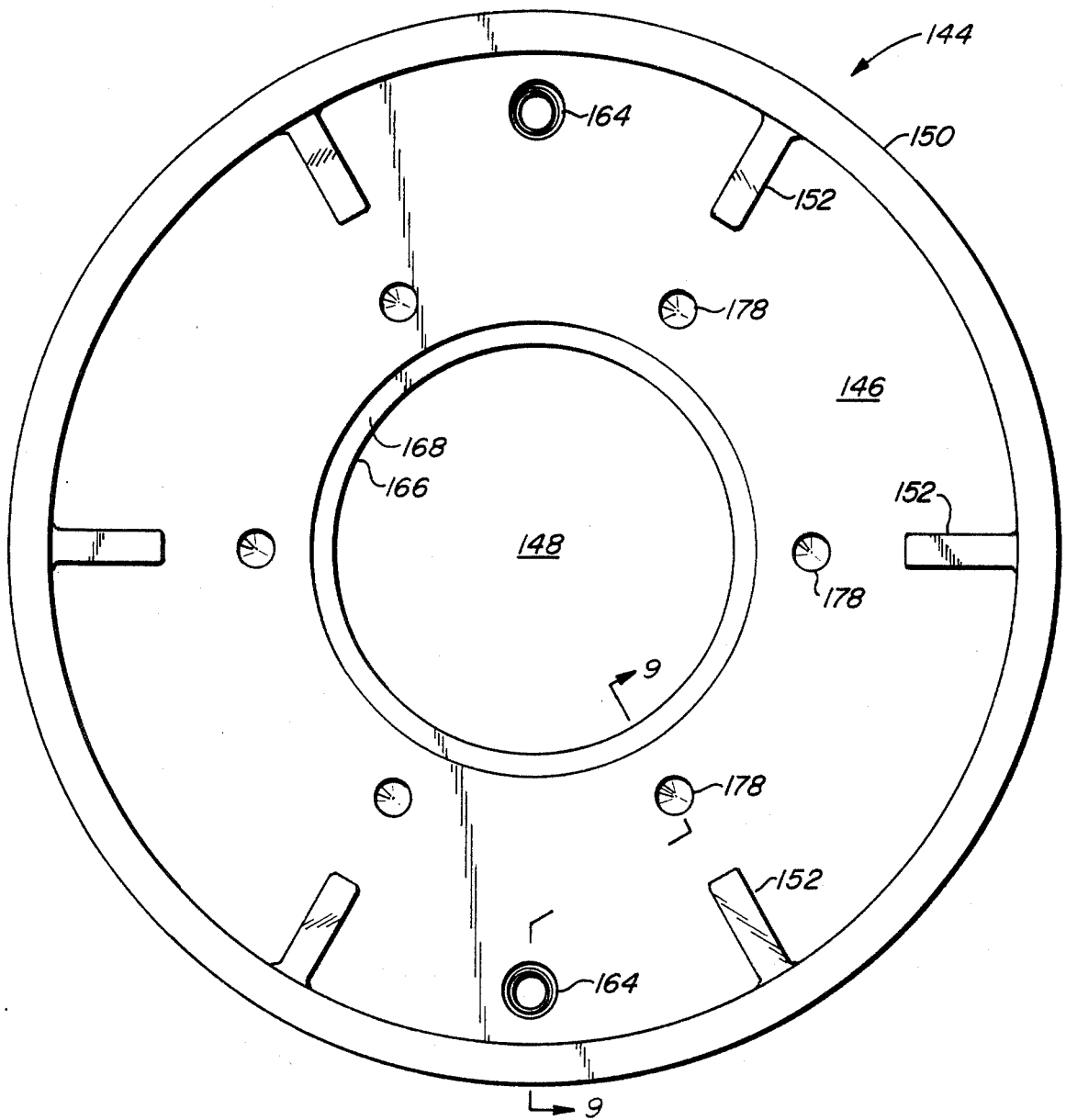
FIG._8.
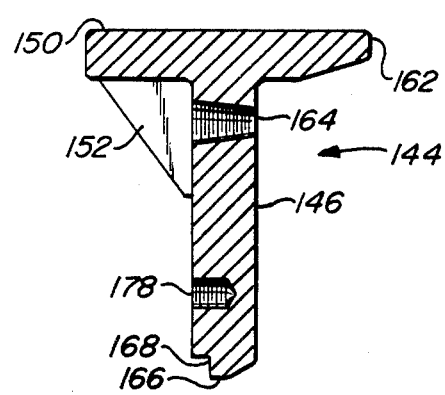
FIG._9.

SLURRY PUMP MECHANICAL SEAL MOUNTING ASSEMBLY

FIELD OF THE INVENTION

The present invention is directed generally to a mechanical seal mounting assembly. More particularly, the present invention is directed to a mechanical seal mounting assembly for a slurry pump. Most specifically, the present invention is directed to a mechanical face type seal mounting assembly for use with high solids concentration slurry pumps. A mechanical seal assembly is installed in a pump whose impeller seal clearance is adjusted by axial displacement of the pump shaft. The mechanical seal's stationary assembly is carried by a seal carrier which passes through the back plate of the pump. An O-ring is held by a retainer about the seal carrier to prevent static leakage while still allowing axial movement of the seal carrier and stationary seal assembly. A split gland assembly supports the seal carrier and facilitates its attachment to the pump shaft bearing assembly through an adjusting gland bolt. Seal adjustment is possible during pump operation and seal replacement is simplified.

Description of the Prior Art

Centrifugal pumps are well known generally in the art and are used in numerous industrial situations. A typical centrifugal pump includes an impeller having vanes which extend radially outwardly. The impeller is supported for rotation in a housing and is caused to be rotated by a suitable drive motor through a shaft connection. Material being pumped enters the housing, generally at or near the center of the impeller and is forced radially outwardly by centrifugal force through the impeller's vanes.

A sealing assembly must be provided to prevent flow of the pumped material through the pump housing or casing at the point where the impeller drive shaft passes through the housing. If the material being pumped is a liquid which is free of abrasive materials, a high concentration of solids, or other materials, the shaft seal assembly can be relatively uncomplicated. However, in a centrifugal slurry pump, a variety of shaft seal problems arise. When a high concentration slurry, such as one with a solids concentration of, for example, 25% or greater is being pumped, the particles entrained in the liquid will get between the stationary and rotating faces of the shaft seal assembly and cause rapid wear of the seal. These high solids concentration slurries also cause a relatively rapid wearing away of the impeller and housing surfaces. As these surfaces wear, impeller seal clearance will increase and must be adjusted to maintain pumping efficiency. This can be accomplished by providing an axially adjustable impeller shaft. Such a shaft requires a shaft seal and mounting assembly which will accommodate axial movement of the shaft.

Since high solids concentration slurries pumped by centrifugal slurry pumps are destructive of both the pump impellers and other wetted surfaces, as well as the shaft seal assemblies themselves, it is expected that these seals and parts will not have an extremely long life. Field replacements of the seals, as well as of the slurry pump high wear wetted parts, is expected. It would be beneficial if these repairs and replacements could be done without dismantling the pump motor and drive shaft. In the prior art centrifugal slurry pumps, the pump shaft seal was typically a double seal assembly which required a clean liquid to continually flush the seal assembly. While this seal assembly was generally effective in sealing the rotating shaft, it was complex, required a clean flushing liquid and was difficult to install and service.

In U.S. Pat. No. 4,418,919 to Wentworth and assigned to Borg-Warner Corporation, there is disclosed a rubber in shear mechanical face seal (RIS) which has eliminated the requirement of the double seal arrangement and the liquid flush. This seal assembly, which is intended for use specifically with a slurry pump, utilizes face seal rings that are resiliently urged into sealing relation by at least one elastomeric assembly loaded in shear. The seal structure disclosed in the above-identified patent has been a satisfactory alternative to the prior double seal and clear liquid flush arrangement. There is still a need, however, for an assembly which will enhance the application of this type of seal or a similar seal to a centrifugal slurry pump. Such an assembly must allow pump impeller seal clearances to be adjusted without affecting seal setting, must allow seal adjustment during pump operation, must be structured to allow seal and assembly replacement through the liquid end of the pump, and must be durable, uncomplicated and unaffected by the various abrasive and otherwise deteriorating materials for which centrifugal slurry pumps are used. Such a seal carrying assembly is not presently available and it is to the provision of such an assembly that the present invention is directed.

SUMMARY OF THE INVENTION

It is an object of the present invention to provide a mechanical seal mounting assembly.

Another object of the present invention is to provide a seal mounting assembly for a centrifugal slurry pump.

A further object of the present invention is to provide a seal mounting assembly for seals, such as a rubber in shear seal.

Yet another object of the present invention is to provide a seal mounting assembly for a centrifugal pump having an axially adjustable shaft.

A still further object of the present invention is to provide a seal mounting assembly which facilitates adjustment of seal clearance during pump operation.

Yet a still further object of the present invention is to provide a seal mounting assembly installable through the liquid end of the pump.

As will be set forth in greater detail in the description of the preferred embodiment, the seal mounting assembly in accordance with the present invention is intended for use in securing a seal such as a rubber in shear seal, a type of which is disclosed in the previously noted Wentworth patent, to a centrifugal slurry pump. The rotating seal ring adapter is secured to the impeller shaft and the stationary seal ring adapter is secured to a seal carrier which passes rearwardly through the pump's back plate. A split gland ring attaches to the seal carrier and is, in turn, secured to the pump's bearing assembly. The split gland ring can be moved axially by gland bolts to effect mechanical face seal adjustment. An O-ring assembly surrounds the seal carrier and prevents leakage of any of the pumped fluid.

The axially adjustable pump shaft can be moved to adjust pump impeller seal clearance without affecting the setting of the mechanical seal assembly. The seal carrier is attached to the bearing housing and the rotating seal ring to the impeller shaft. The shaft is connected to the bearing housing through bearings which require axial clearance. Therefore, relative motion exists between the shaft and bearing housing which will affect seal setting as required by bearing clearances.

Adjustment of the face seal assembly can be made during pump operation. As an abrasive slurry is being pumped and causes seal face wear, the seal faces can be moved toward each other by adjustment of the split gland ring through the gland bolt. Precise seal adjustment can be made for each pumping application, thereby eliminating the detrimental effects of added preload forces which will previously have been used to compensate for unknown operating conditions.

The seal and mounting assembly can be installed through the liquid end of the pump without removal of the impeller shaft, bearings, or drive motor. The seal carrier is sized to slide through the pump's back plate so it can then be secured to the split gland ring. Maintenance costs are reduced since the pump shaft bearing life is expected to be many times that of the seal assembly and other liquid end parts. Complete pump overhaul is thus necessary only when the pump shaft bearings fail and not when the mechanical seal assembly wears out. If a bearing assembly does fail, it can be removed and replaced by a spare assembly that has been assembled in a clean shop environment and includes the mechanical face seal and mounting assembly of the present invention. The cartridge-type bearing assembly, together with the mechanical rotary seal carried by the mounting assembly of the present invention, can be installed by a mechanic in a single operation. This is a particularly beneficial feature especially when bearings fail at times or in locations where experienced mechanics are not readily available. The failed bearing and seal can be removed as a unit and replaced with a new bearing and seal unit which does not need extensive field adjustment.

Should there be leakage of the pumped fluid between the seal carrier and stationary pump back plate, a stationary O-ring assembly is carried by the seal carrier intermediate its ends. This O-ring can be removed, cleaned, and replaced without removing the seal. The seal carrier can slide with respect to the O-ring during mechanical seal or impeller seal adjustment.

The slurry pump mechanical face seal mounting assembly in accordance with the present invention is useable with numerous pump assemblies and facilitates the mounting and usage of a mechanical seal assembly. The mounting assembly is uncomplicated, durable, adaptable to various pump structures, can be used as a cartridge assembly with a cartridge bearing assembly, and is generally superior to prior art devices.

DESCRIPTION OF THE DRAWINGS

While the novel features of the slurry pump mechanical seal mounting assembly in accordance with the present invention are set forth with particularity in the appended claims, a full and complete understanding of the invention and its operation may be had by referring to the detailed description of a preferred embodiment, as set forth hereinafter and as may be seen in the accompanying drawings in which:

FIG. 1 is a side elevation view, partly in section, of a centrifugal slurry pump showing the mechanical seal mounting assembly of the present invention;

FIG. 2 is a sectional side elevation view of the seal carrier of the seal mounting assembly;

FIG. 3 is an end view of the seal carrier of FIG. 2 and showing the stationary seal ring adapter receiving end;

FIG. 4 is an elevation view of the split gland ring in accordance with the present invention;

FIG. 5 is an end view of the gland nut for use with the split gland ring of FIG. 4;

FIG. 6 is a side elevation view of the gland nut of FIG. 5;

FIG. 7 is a side elevation view of a gland bolt for use with the gland ring of FIG. 5;

FIG. 8 is an end view of the pump back plate for the slurry pump in accordance with the present invention;

FIG. 9 is a cross-sectional view of the pump back plate taken along line IX—IX of FIG. 8;

FIG. 10 is an end view of the O-ring retainer for the mechanical seal mounting assembly; and FIG. 11 is a cross-sectional view of the O-ring retainer taken along line XI—XI of FIG. 10.

DESCRIPTION OF THE PREFERRED EMBODIMENT

Referring initially to FIG. 1, there may be seen generally at 20 a portion of a generally conventional centrifugal slurry pump. A mechanical face seal assembly is shown generally at 22 and is structured in accordance with U.S. Pat. No. 4,418,919 whose disclosure is incorporated herein by reference. Seal assembly 22 is mounted on pump 20 by a face seal mounting assembly, generally at 24 in accordance with the present invention.

As is generally well known in the art, centrifugal slurry pump 20 includes an impeller 26 which is carried for rotation in a housing generally at 28. Fluid to be pumped flows in at the center or suction side of impeller 26 and is forced radially outwardly through passageways 30 in the impeller. Impeller 26 is supported and driven by an elongated pump drive shaft 32 that is rotatably supported by a bearing housing assembly, generally at 36. A suitable drive means, not shown, is provided for rotating drive shaft 32 and impeller 26 in a generally known manner.

High solids concentration slurries which are typically pumped by a centrigugal slurry pump such as shown in FIG. 1 are apt to be quite abrasive and it is therefore necessary to be able to adjust the position of impeller 26 with respect to pump housing 28 in order to maintain a proper impeller seal clearance 27. Such adjustment is typically accomplished by axial movement of pump shaft 32 and bearing housing assembly 36. This may be accomplished by slideably supporting bearing housing assembly 36 in a pump base in a generally known manner. This axial adjustability of pump shaft 32 is conventional and does not form a portion of the subject invention. It will further be understood that the above description of a centrifugal slurry pump assembly 20 is to be considered exemplary of various pump assemblies to which the seal mounting assembly 24 in accordance with the present invention can be utilized.

Referring again to FIG. 1, mechanical face seal assembly, generally at 22, includes a rotatable seal ring 40 and a stationary seal ring 42, the rings having seal faces 44 and 46, respectively, opposing and resiliently urged toward one another. For a more complete description of these seal rings 40 and 42, reference may be had to the Wentworth U.S. Pat. No. 4,418,919. A rotating seal ring adapter 48 is attached to pump shaft 32 by being clamped between a hub portion 50 of impeller 26, which may be threaded on shaft 32 and a shaft sleeve 52 which overlies pump shaft 32. Rotating seal ring adapter 48 is generally in the shape of an L in cross section with the leg portion 54 of the L being engaged by impeller hub 50 and shaft sleeve 52. A suitable gasket 56 may be placed between the rotating seal ring adapter and impeller hub 50 while an O-ring 58 is placed in a ring groove 60 between adapter 48 and shaft sleeve 52. If desired, shaft sleeve 52 could be dispensed with and a suitable step could be provided on pump shaft 32. The base portion 62 of rotating seal ring adapter 48 overlies the outer peripheral surface 64 of rotating seal ring 40. A plurality of suitable drive pins 66 extend between rotating seal ring 40 and rotating seal ring adapter 48 to ensure that ring 40 rotates with seal ring adapter 48 and pump shaft 32.

Stationary seal ring 42 is secured by similar suitable locating pins 68 to a stationary seal ring adapter 70 which is discussed in greater detail in the Wentworth patent. This adapter 70 includes an elastomeric material 72 bonded to an outer metal band 74 and to an inner cup-like ring 76. The elastomeric core 72 biases the seal rings 40 and 42 together to provide proper sealing force between seal faces 44 and 46.

Stationary seal ring adapter 70 is generally J shaped with the leg portion 78 of adapter 70 being secured to a seal carrier, generally at 80 by engagement with a first end 81 thereof. Seal carrier 80, as may be seen in greater detail in FIGS. 2 and 3, is generally cylindrical and is positionable concentrically about pump drive shaft 32, as shown in FIG. 1. First end 81 of seal carrier 80 has an enlarged inner periphery formed by a radially outwardly extending recess 82 which terminates in an outwardly tapering lipped groove 84. As seen in FIG. 1, the cup-like metal ring 76 of stationary seal ring adapter 70 is received in recess 82 while the elastomeric material 72 portion of adapter 70 is seated in the lipped groove 84. A plurality of locater pins 86 are attached to cup-like ring 76 and are received in suitable bores 88 formed in a radially extending wall surface 90 of recess 82.

Seal carrier 80, which is of a suitable corrosion-resisting metal or similar material, extends to the left, as seen in FIGS. 1 and 2, to a second end 92 having a reduced outer diameter 94. A circumferential groove 96 is formed in the reduced outer diameter surface 94 and is located on surface 94 intermediate second end 92 of sleeve carrier 80 and a radially outwardly extending shoulder 98 that extends between reduced outer diameter surface 94 and the outer peripheral surface 100 of seal carrier 80.

A split gland ring, generally at 102, is securable about the second end 92 of seal carrier 80, as may be seen in FIG. 1. Split gland ring 102 may be seen most clearly in FIG. 4 and is comprised of two generally similar semicylindrical ring halves, an upper ring half 104 and a lower ring half 106. Each of the ring halves 104 and 106 terminates in radially outwardly extending flanges 108. These flanges are suitably bored and receive bolts 110 which pass through the bores and are engaged by nuts 112 to join the two ring halves 104 and 106 together.

Each of the split gland ring halves 104 and 106 is provided with semicylindrical recesses 114 which are formed intermediate the outer terminus of flanges 108 and an inner peripheral surface 116. These semicircular recesses 114 cooperate when the split gland ring is assembled to form gland nut receiving apertures 118.

A gland nut, generally at 120, as may be seen in FIGS. 1, 5, and 6, is positioned in each aperture 118 when the split gland ring halves 104 and 106 are joined together by bolts 110 and nuts 112 to form split gland ring 102. As may be seen in FIGS. 5 and 6, gland nut 120 is generally cylindrical and has a central axial threaded bore 122. The outer peripheral surface of gland nut 120 is divided into three segments. At a first end, the outer surface of gland nut 120 is formed as a conventional six-sided nut 124. The second end of gland nut 120 is structured with an outwardly extending retaining flange 126. The peripheral surface of gland nut 120 between the two ends 124 and 126 is structured as a reduced diameter bearing surface 128. The outer diameter of this bearing surface is selected to be slightly smaller than the diameter of the gland nut receiving apertures 118 in split gland ring 102. Thus, gland nut 120 can freely rotate in gland nut receiving apertures 118 in split gland ring 102 but cannot slide axially.

Referring again to FIGS. 1 and 4, the inner periphery 116 of split gland ring 102 includes a central radially inwardly extending boss 130. This boss 130 has a width which cooperates with circumferential groove 96 on the second end 92 of seal carries 80. When the two halves 104 and 106 of split gland ring 102 placed about end 92 of seal carrier 80 and are bolted together by bolts 110, the seal carrier 80 is secured to the split gland ring 102. A suitable locking pin may be placed through a lock pin aperture 132 in groove 96 of seal carrier 80 to extend into a cooperating lock pin aperture 134 in split ring half 104, thereby preventing the seal carrier from possibly rotating in split gland ring 102.

A threaded gland bolt, generally at 136, may be seen in FIG. 7. Gland bolt 136 has a first elongated threaded portion 138 whose threads are selected to be complimentary to the threaded bore 122 of gland nut 120. A short threaded second end 140 of gland bolt 136 is secured to the cartridge bearing housing assembly 36, as may be seen in FIG. 1. Suitable nut shaped flats 142 are provided adjacent short end 140 of gland bolt 136 to facilitate the tightening of the gland bolt 136 into the bearing assembly 36.

As can be seen in FIG. 1, the centrifugal slurry pump 20 includes a pump back plate, generally at 144. This plate may also be seen in FIGS. 8 and 9 and is generally in the shape of a circular disk 146 having a central seal carrier receiving aperture 148 and a peripheral encircling rim flange 150. A plurality of reinforcing ribs 152 may be provided to aid in reinforcing the flange 150 and disk 146. As shown in FIG. 1, the peripheral rim flange portion 150 of pump back plate 144 is clamped between a frame plate liner insert 154 and a frame plate 156 by suitable frame plate liner insert bolts 158. A resilient seal ring 160 is carried by frame plate liner insert 154 and engages a first edge 162 of rim flange 150. Suitable threaded bores 164 are provided in disk 146 and receive vent assemblies (not shown) so that the pump seal cavity can be vented during startup to prevent air from displacing liquid lubrication between seal faces 44 and 46.

The inner edge 166 of circular disk 146 of pump back plate 144 includes an O-ring groove 168 formed on the nonwetted side of disk 146. An O-ring seal 170 is positioned in O-ring groove 168 and is held in place by an O-ring retainer 172 that may be seen most clearly in FIGS. 10 and 11. O-ring retainer 172 is attached to the nonwetted side of pump back plates 144 by a plurality of bolts 174 which pass through apertures 176 in O-ring retainer 172 and are received in threaded bores 178 in pump back plate 144. The inner diameter of O-ring retainer 172 is less than the inner diameter of pump back plate 144 so that an inner edge 180 of O-ring retainer 172 is more closely adjacent the outer surface of seal carrier 80 than is the inner edge 166 of circular disk 146 of pump back plate 144. The size of the O-ring 170 placed within O-ring groove 168 is selected so that O-ring retainer 172 will compress the O-ring 170, thus allowing the O-ring to act as a compression packing by completely filling the O-ring groove 168 when the bolts 174 are tightened.

The mechanical seal mounting assembly in accordance with the present invention is easily and quickly installed and adjusted. Gland bolts 136 are threaded into the bearing housing assembly 36 and the gland nuts 120 are threaded onto elongated threaded portions 138 of gland bolts 136. These gland nuts 120 are preceded by jam nuts 182 as seen in FIG. 1. An O-ring 170 can be placed in O-ring groove 168 and O-ring retainer 172 tightened to compress O-ring 170. With the pump impeller 26 removed, the seal carrier 80 and the attached stationary seal ring adapter 70 are slid along shaft 32 through the central seal carrier receiving aperture 148 in pump back plate 144. Split gland ring 102 is placed about the rear end 92 of the seal carrier 80 so that boss 130 on the split gland ring 102 is received in circumferential groove 96 in seal carrier 80. At the same time, the locking pin is positioned in apertures 132 and 134 and the gland nuts 120 are positioned so that their reduced diameter bearing surfaces 128 are positioned within the gland nut receiving apertures 118 of split gland ring 102. Rotating seal ring adapter 48 is placed about shaft 32 and is moved rearwardly until the L-shaped leg 54 is in contact with shaft seal 52. The impeller 26 is then secured to the shaft 32. The seal carrier 80 and the stationary seal ring adapter 70 can now be moved axially along pump drive shaft 32 by rotation of gland nuts 120. Once the proper seal face contact pressure has been established, jam nuts 182 are tightened to hold gland nuts 120 in place.

During operation of the pump, it may become necessary to adjust the engagement pressure of the mechanical seal faces. This can be accomplished by backing off jam nut 182 and by turning gland nut 120 on gland bolt 136. Rotation of gland nut 120 will cause split gland ring 102 and hence seal carrier 80 and stationary seal ring adapter 70 to move axially in relation to pump shaft 32. Adjustment of pump impeller seal clearance can be made independently of the mechanical seal face contact pressure. Pump shaft 32 is moved axially in a generally known manner by moving cartridge bearing housing assembly 36 axially. Since the split gland ring 102 and its associated mounting means are secured to the cartridge bearing housing and further since rotary seal ring adapter 48 is secured to shaft 32, the entire mechanical seal assembly moves axially with the pump shaft 32 and bearing assembly 36.

Servicing or replacement of the mechanical seal assembly can be effected entirely through the wet end of the pump. The suction side of the pump can be disassembled and the impeller 26 and rotating seal ring adapter 48 removed from shaft 32. The split gland ring 102 can be separated into its two halves and the stationary seal ring adapter 70 and seal carrier 80 slid out through the pump back plate 144. If necessary, the O-ring retainer 172 can be detached from back plate 144 to allow seal carrier 80 to slide more freely. O-ring retainer 172 can be detached from the pump back plate 144 and a new O-ring 170 installed in O-ring groove 168 without removing the seal carrier by positioning the new O-ring around the seal carrier and adhesively attaching it.

Should it become necessary to replace the cartridge bearing assembly deiete and housing 36, this can be accomplished by installing a spare cartridge bearing and housing assembly which has been assembled in a clean shop environment and which at least, carries with it a replacement split gland assembly, a seal carrier, and a stationary seal ring adapter. Thus, the complete assembly can be removed and replaced with a minimum amount of pump-down time.

While the description of the preferred embodiment of a mechanical seal mounting assembly has been set forth hereinabove with reference to a WARMAN 4/3 E-HH metal-lined pump, it will be apparent that the mechanical seal mounting assembly in accordance with the present invention is equally well suited for other similar pumps. The structure of the pump back plate, the connection of the split gland ring's gland bolt to the cartridge bearing assembly, and the securement of the pump impeller to the pump drive shaft may vary with pump brand and model but the structure of the seal mounting assembly will remain the same. It will also be obvious to one skilled in the art that various other modifications, such as to the rotating seal ring adapter, its securement to the pump shaft, the shape of the pump shaft, the placement of various bushings and O-ring seals, the shape of the pump casings and the like may be made without departing from the true spirit and scope of the present invention and that the invention is accordingly to be limited only by the following claims:

I claim:

1. In a pump having an impeller rotatably driven by an axially moveable rotatable pump shaft supported by an axially adjustable bearing assembly and having a mechanical seal assembly including a rotatable seal ring adapter secured to and rotatable with the pump shaft and a stationary seal ring adapter attached to a first end of a cylindrical seal carrier which is sized to completely pass through a pump back plate, a mounting assembly for the seal carrier, said mounting assembly comprising:
   a split gland ring having spaced gland nut receiving apertures, said split gland ring having an inner peripheral portion engageable with a second end of the seal carrier;
   a gland nut having a central longitudinal threaded bore and being rotatably positioned in each of said gland nut receiving apertures;
   a gland bolt receivable in said central longitudinal threaded bore in each of said gland nuts and secured to the axially adjustable bearing assembly; and
   means for forming a stationary seal between the seal carrier and the pump back plate.

2. The mounting assembly of claim 1 wherein said split gland ring has two semicircular halves.

3. The mounting assembly of claim 1 wherein each of said gland nuts has an outer annular bearing surface which is adapted to be received in one of said gland nut receiving apertures.

4. The mounting assembly of claim 3 wherein each of said gland nuts further includes a nut at a first end of said bearing surface and an outwardly extending retaining flange at a second end of said bearing surface.

5. The mounting assembly of claim 4 wherein each of said gland bolts carries a jam nut which is engageable with said nut at said first end of each of said bearing surfaces.

6. The mounting assembly of claim 1 wherein said means for forming a stationary seal between the seal carrier and the pump back plate is an O-ring carried in an O-ring groove in an edge portion of the pump back plate which overlies the seal carrier.

7. The mounting assembly of claim 6 further including an O-ring retainer secured to the pump back plate and contacting said O-ring to compress said O-ring in said O-ring groove.

8. The mounting assembly of claim 1 wherein said inner peripheral portion of said split gland ring includes an inner peripheral boss, said boss being positionable in a circumferential groove at said second end of the seal carrier.

9. The mounting assembly of claim 8 wherein a lock pin aperture is provided in said inner peripheral boss, said lock pin aperture being adapted to receive a lock pin that passes through said second end of the seal carrier and into said lock pin aperture to prevent relative rotation between said gland ring and the seal carrier.

* * * * *